| | | | |
|---|---|---|---|
| United States Patent [19] | | [11] | 3,859,495 |
| Takahashi et al. | | [45] | Jan. 7, 1975 |

[54] SUBMERGED-ARC WELDING MACHINE

[75] Inventors: Nobuhiro Takahashi; Tatsuo Ide, both of Fukuyama, Japan

[73] Assignee: Nippon Kokan Kabushiki Kaisha, Tokyo, Japan

[22] Filed: Apr. 26, 1973

[21] Appl. No.: 354,760

[30] Foreign Application Priority Data
Jan. 25, 1973  Japan.............................. 48-11426

[52] U.S. Cl............... 219/125 R, 74/54, 219/60 R, 219/73, 219/76, 219/130, 228/27
[51] Int. Cl.......................... B23k 9/12, B23k 9/18
[58] Field of Search........ 219/124, 125 R, 126, 130, 219/73, 60 R, 76; 228/27; 74/53, 54, 55

[56] References Cited
UNITED STATES PATENTS

| | | | |
|---|---|---|---|
| 1,667,585 | 4/1928 | Chapman............................ | 219/124 |
| 1,676,985 | 7/1928 | Haughton........................ | 219/125 R |
| 2,479,412 | 8/1949 | Rutter................................ | 219/126 X |
| 2,817,748 | 12/1957 | Meyer................................ | 219/126 |
| 3,185,814 | 5/1965 | Rossner et al. ....................... | 219/76 |
| 3,264,445 | 8/1966 | Arnoldy............................... | 219/76 |
| 3,306,116 | 2/1967 | Ross et al...................... | 219/124 UX |
| 3,571,557 | 3/1971 | Valentine........................ | 219/124 X |

*Primary Examiner*—Anthony Bartis
*Attorney, Agent, or Firm*—Flynn & Frishauf

[57] ABSTRACT

A submerged-arc welding machine comprises a welding head pivoted to a frame of the machine so as to be rockable across the seam of a workpiece being welded, and a vertically movable oscillation mechanism provided with an eccentric cam engaging the welding head for causing the welding head to rock across the seam as the cam rotates. Further included is an oscillation amplitude adjusting device for moving the oscillation mechanism as well as the cam vertically, whereby the axis of rotation of the cam is adjustable relative to that point on the frame about which the welding head pivots to adjust the amplitude of the rockable movement of the welding head.

3 Claims, 3 Drawing Figures

SUBMERGED-ARC WELDING MACHINE

BACKGROUND OF THE INVENTION

I. Field of the Invention

This invention relates to a submerged-arc welding machine, and more particularly to an oscillatory submerged-arc welding machine capable of adjusting the amplitude of an oscillatory welding head.

II. Description of the Prior Art

There has been known a submerged-arc welding machine which includes a welding head oscillating across the seam of a workpiece being welded in order to elevate welding efficiency and improve the physical or mechanical properties of the welded part. However, such prior art welding machine had the drawback that the extremely intricate structure of the oscillatory welding head naturally led to a complicated mechanism for varying the amplitude of said oscillation, obstructing the easy control of the amplitude.

SUMMARY OF THE INVENTION

It is accordingly the object of the invention to provide a submerged-arc welding machine of simple structure fitted with an oscillatory welding head whose amplitude can be easily controlled over a broad range.

According to an aspect of this invention, there is provided a submerged-arc welding machine comprising a welding head capable of freely oscillating across the seam of a workpiece being welded and holding a welding wire; an oscillating mechanism for oscillating the welding head across the seam of a workpiece being welded; and an amplitude adjusting device for limiting the amplitude of the oscillatory welding head by controlling said oscillating mechanism. The oscillating mechanism may comprise an eccentric cam whose outer peripheral surface abuts against one side wall of the welding head and a bearing member for rotatably supporting said cam. The amplitude adjusting device is operated for the vertical movement of said bearing member, has its upper and lower ends mounted in the welding machine so as to rotate about its own axis and comprises a threaded shaft engaged with a vertically extending female screw formed in the inner wall of a bearing mount for holding the aforesaid bearing member.

DESCRIPTION OF THE PREFERRED EMBODIMENT

Figure 1:
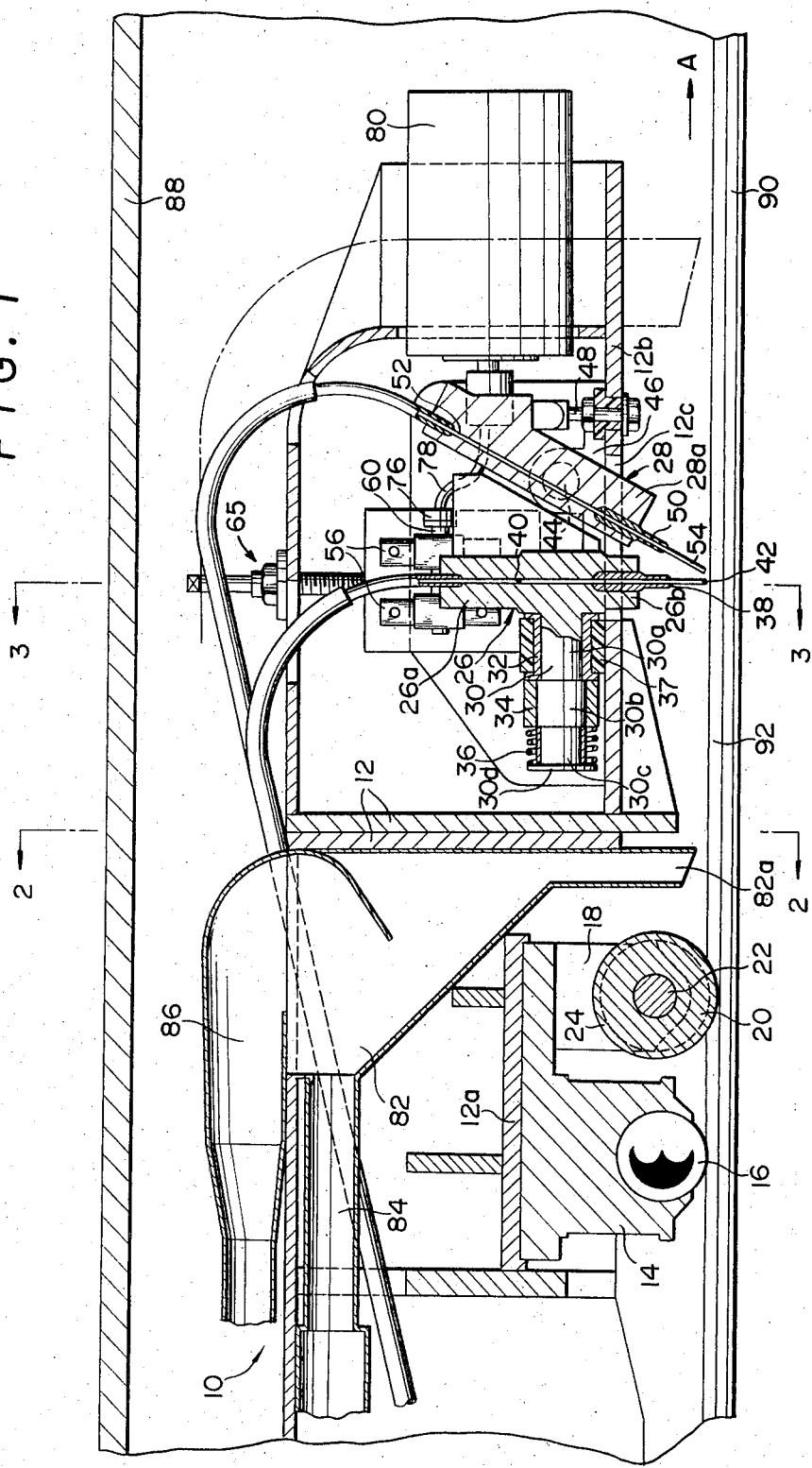
FIG. 1 is a cross sectional view of a submerged-arc welding machine according to an embodiment of this invention.
Figure 2:
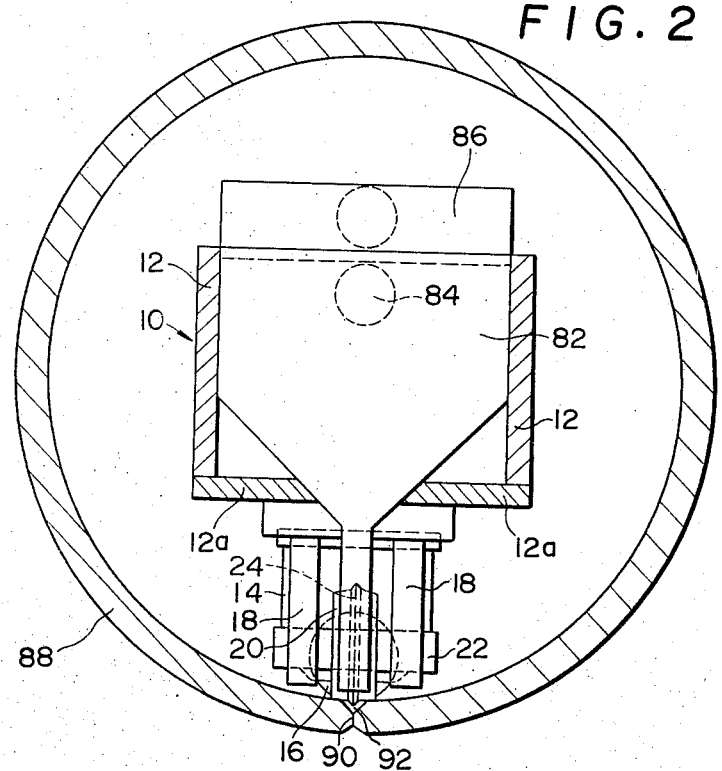
FIG. 2 is a cross sectional view on line 2—2 of FIG. 1.

A submerged-arc welding machine generally designated by 10 is provided with a frame 12. To the underside of the left bottom portion 12a (FIG. 1) of the frame 12 is fitted a support block unit 14 so as to be suspended therefrom. In the lower end portion of the support block unit 14 is rotatably received a ball 16 so as to be partly exposed to the outside. From one end portion (the right end portion of FIG. 1) of the support block unit 14 hang a pair of arms 18 (FIG. 2), between which there is provided a guide wheel 20 rotatably supported by a shaft 22 (FIGS. 1 and 2). The central part of the outer periphery of the guide wheel 20 is integrally provided with a circumferential ridge 24 having a V-shaped cross section so as to guide the welding machine 10 by rolling through a groove 92 formed in a workpiece 88, such as a steel pipe being welded. A circle defined by the apex of the V-shaped ridge 24 is made to fall on the same plane as that including the center of the ball 16.

Referring to FIG. 1, the bottom portion 12b of the frame 12 disposed on the right side of the bottom portion 12a thereof is fitted with an oscillatory welding head or first welding head 26 made of electrically conductive material and a fixed welding head or second welding head 28. The oscillatory welding head 26 comprises a main body 26a whose lower end portion projects downward from an opening 12c provided in the right bottom portion 12b of the frame 12 and a shaft 30 projecting leftward (FIG. 1) at a point slightly below the middle part of the main body 26a. The shaft 30 has a smaller diameter section 30a, a larger diameter section 30b, a smaller diameter section 30c and a flange 30d formed at the left end of the shaft 30 all arranged in the order mentioned as viewed from that side of the shaft 30 which is adjacent to the oscillatory welding head 26. The smaller diameter section 30a and larger diameter section are surrounded with a sleeve 32 of electrically conductive material having flanged portions formed at both ends and a ring member 34 of electric conductive material respectively. Between the flange 30d of the shaft 30 and the ring member 34 is disposed a compression helical coil spring 36 surrounding the smaller diameter section 30c of the shaft 30. Said coil spring 36 normally urges the ring member 34 so as to press the right end face of said ring member 34 to the left end face of the sleeve 32. The sleeve 32 is placed in a bearing member 37 of electrically nonconducting material fixed to the upper surface of the right bottom portion 12b of the frame 12. The oscillatory welding head 26 can oscillate about the shaft 30. The lower end portion 26b of the oscillatory welding head 26 is fitted with a welding nozzle tip 38. Further, there is bored a long through hole 40 penetrating the main body 26a of the oscillatory welding head 26 and nozzle tip 38. Into said hole 40 is inserted a welding wire 42 whose lower end portion projects downward from the nozzle tip 38.

Referring to FIG. 1, the lower end portion 28a of the fixed welding head 28 is disposed behind the oscillatory welding head 26 (namely at the right of the oscillatory head 26 in FIG. 1) and projects downward from the opening 12c cut out in the right bottom portion 12b of the frame 12 so as to be inclined downward toward the oscillatory welding head 26. The fixed welding head 28 is mounted on a bearing member 46 fixed to the frame 12 through a shaft 44 provided at that part of the right side wall of the fixed welding head 28 which is located slightly below the middle part of said head 28. Accordingly, the fixed welding head 28 can be inclined at any angle. The angle of inclination of the fixed welding head 28 is controlled by an angle adjusting device 48 disposed between the right bottom portion 12b of the frame 12 and the fixed welding head 28. The lower end portion 28a of the fixed welding head 28 is fitted with a nozzle tip 50. Into a long through hole 52 penetrating the fixed welding head 28 and nozzle tip 50 is inserted a welding wire 54 so as to project downward from the nozzle tip 50. The ball 16, hide wheel 20 and oscillatory and fixed welding heads 26 and 28 are so arranged that where the oscillatory welding head 26 is erected upright, the center of the ball 16 and the circle defined by the apex of the ridge 24 formed on the guide wheel 20 and the lower ends of the welding wires 42 and 54 fall on the same plane so as to be aligned, as later described, with the groove 92 of the workpiece 88 being welded.

Figure 3:
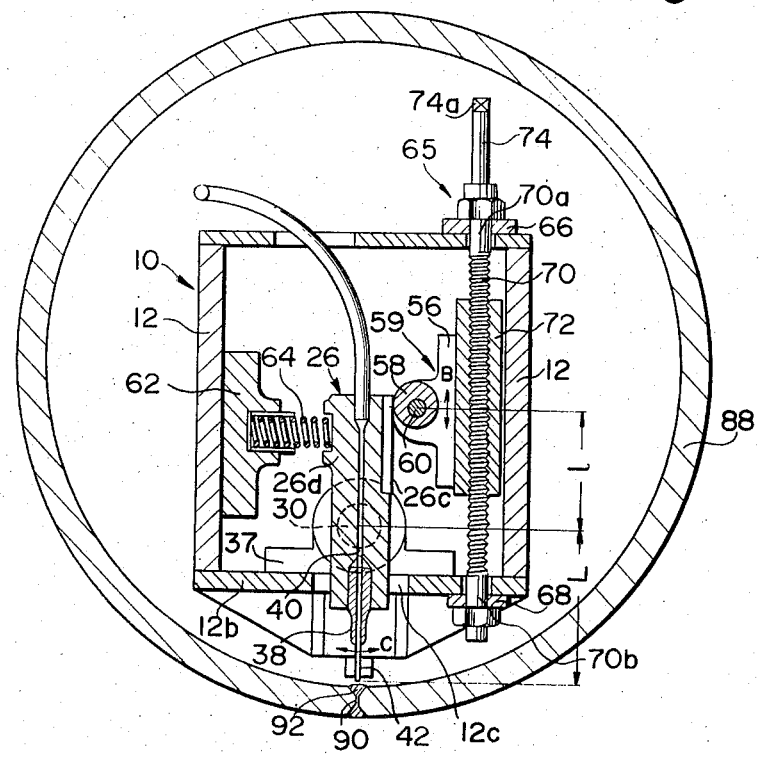
FIG. 3 is a cross sectional view on line 3—3 of FIG. 1.

As shown in FIGS. 1 and 3, a pair of vertically movable bearing members 56 are is provided on one side of the oscillatory welding head 26. Further, an eccentric cam 58 whose outer periphery abuts against the backside 26c of the oscillatory welding head 26 is eccentrically fixed to a shaft 60 horizontally penetrating the bearing member 56.

Referring to FIG. 3, to the inner wall of that part of the frame 12 which faces the left side 26d of the oscillatory welding head 26 is fixed a spring seat 62. Between the spring seat 62 and the left side 26d of the oscillatory welding head 26 is provided a compression helical spring 64 so as to urge the oscillatory welding head 26 to the right, thereby causing the backside 26c of the oscillatory welding head 26 to be pressed against the outer periphery of the eccentric cam 58.

An amplitude adjusting device 65 vertically penetrates the frame 12 in proximity to the backside thereof. This amplitude adjusting device 65 comprises collars 66 and 68 provided at the upper and lower ends 70a and 70b so as to abut against the upper and lower walls of the frame 12 respectively; a threaded shaft 70 rotatable about its own axis, but immovable lengthwise; and a bearing mount 72 into which said threaded shaft 70 is screwed, and which is lifted or lowered according to the direction in which said threaded shaft 70 rotates, said bearing mount 72 being integrally formed with the bearing member 56 or fixed thereto.

Upward from the upper end of the threaded shaft 70 projects a mandrel 74. When the tip 74a of said mandrel 74 is fitted with a handle (not shown), then the threaded shaft 70 can be manually rotated.

When the threaded shaft 70 rotates, the bearing member 56 can be lifted or lowered as indicated by arrow B in FIG. 3 together with the bearing mount 72. The bearing member 56, eccentric cam 58 and shaft 60 constitute an oscillating mechanism 59.

The shaft 60 of the eccentric cam 58 is interconnected, as shown in FIG. 1, to an electric motor 80 received in the frame 12 through a clutch 76 and a flexible wire 78, and is made to rotate at the prescribed speed by the electric motor 80. Said motor 80 may be connected to the bearing member 56.

Referring again to FIG. 1, reference numeral 82 denotes a flux hopper. Flux is conducted by compressed air into the hopper 82 through a flux feeder 84 extending leftward in the lengthwise direction of the welding machine 10, and let down through the duct 82a of the hopper 82 open downward between the support block unit 14 and the oscillatory welding head 26. The upper end portion of the hopper 82 is open to an exhaust duct 86 disposed on the upper wall of the frame 12. Through said exhaust duct 86 is drawn off to the outside the air which delivered the flux into the hopper 12.

There will now be described by reference to FIGS. 2 and 3 the operation of a submerged-arc welding machine 10 according to this invention in welding the seam 90 of a steel pipe 88.

The submerged-arc welding machine 10 is placed in the steel pipe 88, while being held by a support beam (not shown). The welding machine 10 is so set that the ball 16 is located on the groove 92 of the seam 90 and the ridge 24 of the guide wheel 20 engages said groove 92. Thus the lower ends of the welding wires 42 and 54 received in the welding heads 26 and 28 are also positioned right on the groove 92. Under this condition, the steel pipe 88 is made to travel in the direction of the arrow A indicated in FIG. 1. A proper amount of flux is let to fall on the groove 92 through the duct 82a of the hopper 82. Current is introduced through the ring member 34 and the welding wire 54 received in the fixed welding head 28. The electric motor 80 is driven, and the welding wires 42 and 52 are moved downward at a proper speed by a separate conventional means (not shown). The drive of the electric motor 80 causes the eccentric cam 58 to rotate about the shaft 60, so that the oscillatory welding head 26 horizontally rocks about the shaft 30, namely, across the seam 90 as indicated by arrow C in FIG. 3. Accordingly, the welding wire 42 of the oscillatory welding head 26 is moved along the seam 90 relatively to the travel of the steel pipe 88 in the opposite direction to that of the arrow A of FIG. 1 while drawing a sine curve with respect to said seam 90. In contrast, the lower end of the welding wire 54 of the immovable welding head 28 fixed to the welding machine 10 moves straight on the seam 90 or groove 92 in the opposite direction to that of the arrow A of FIG. 1. In this case, electric current is transmitted to the main body 26a of the oscillatory welding head 26 through two paths: one transmitting from the ring member 34 to the larger diameter section 30b of the shaft 30 and the other transmitting from said ring member 34 to the smaller diameter section 30a of said shaft 30 through the sleeve 32, and finally to the welding wire 42 of the oscillatory welding head 26. Therefore, power supply from the ring member 34 to the welding wire 42 is effected very reliably without any failure. Upon introduction of current, electric arcs arise in the flux supplied to the groove 92 between the group of the welding wires 42 and 54 and the seam 90 of the steel pipe 88, thereby automatically welding the seam 90.

There will now be described the process of controlling the amplitude of the oscillatory welding head 26. Let it be assumed that the vertical distance between the center of the shaft 30 and that of the shaft 60 of the eccentric cam 58 is indicated by l and that the vertical distance between the center of the shaft 30 and the lower end of the welding wire 42 is represented by L. Then the oscillation amplitude of the lower end of the welding wire 42 may be expressed as follows:

$1/2 \times L/l \times$ offset of eccentric cam

Therefore, it will be seen that said amplitude is in inverse proportion to l.

Where the end 74a of the mandrel 74 is rotated in such a direction as effects the lifting of the bearing mount 72 (for example, rightward, in case the threaded shaft 70 has right hand threads), then l increases to reduce the oscillation amplitude of the lower end of the welding wire 42. Conversely where the end 74a of the mandrel 74 is rotated in such a direction as attains the fall of the bearing mount 72, then l decreases to enlarge the oscillation amplitude of the lower end of the welding wire 42.

As apparent from the foregoing description, this invention has the advantage that the oscillation amplitude of the lower end of the welding wire 42, namely, that of the oscillatory welding head 26 can be varied steplessly over a broad range, thereby considerably simplifying the structure of an amplitude adjusting mechanism.

The automatic welding of the steel pipe 88 by the submerged-arc welding machine of this invention may also be effected by moving said steel pipe 88 in the opposite direction to that of the indicated arrow A of FIG. 1. Further, the present welding machine may be applicable in the welding of the outer peripheral surface of a pipe or a flat plate.

The oscillation frequency of the oscillatory welding head 26 can be controlled by the rotating speed of the electric motor 80.

What we claim is:

1. A submerged-arc welding machine including:
    a frame;
    at least one oscillatory welding head pivoted to said frame so as to be rockable across the seam of a workpiece being welded, said welding head being made of electrically conductive material and supplied with a welding wire;
    an oscillatory mechanism comprising eccentric cam engaging one side wall of said welding head so as to rock said welding head across said seam of said workpiece, a shaft extending lengthwise of said welding machine and supporting said eccentric cam for rotation, and a vertically movable bearing member rotatably supporting said shaft; and
    an oscillatory amplitude adjusting device comprising a threaded shaft vertically penetrating said frame so as to rotate about the axis of said threaded shaft but to be prevented from being moved in the axial direction thereof, and a bearing mount having a cooperatively threaded bore engaged with said threaded shaft and supporting said bearing member being restrained against rotation about said threaded shaft while being free to move axially along the length of said threaded shaft, whereby the position of said bearing member and thereby the axis of rotation of said cam are adjustable relative to the point on said frame about which said welding head pivots to adjust the amplitude of said welding head rocking across said seam of said workpiece.

2. amended) The welding machine according to claim 1 wherein said welding head includes a main body and is pivotally mounted on said frame by means comprising another shaft extending from said main body lengthwise of said welding machine and provided with a smaller diameter section and a larger diameter section in the order as viewed from said main body; a sleeve into which said smaller diameter section is inserted; a bearing member made of electrically nonconductive material, into which said sleeve is inserted and which is fixed to said frame to hold said welding head so as to rock said welding head about said another shaft; a ring member into which said larger diameter section is inserted and which is supplied with electric power; and a spring means for pressing said ring member to said sleeve.

3. The welding machine according to claim 2 wherein there is provided at least one additional welding head carried by said frame, the lower end of which is inclined downward toward said oscillatory welding head and which is supplied with a welding wire.

* * * * *